United States Patent

Azechi et al.

[11] Patent Number: 6,063,487
[45] Date of Patent: May 16, 2000

[54] SILICONE RUBBER COMPOSITIONS FOR HIGH-VOLTAGE ELECTRICAL INSULATORS AND POLYMER INSULATORS

[75] Inventors: Syuuichi Azechi; Noriyuki Meguriya; Susumu Sekiguchi; Takeo Yoshida, all of Usui-gun, Japan

[73] Assignee: Shin-Etsu Chemical Co., Ltd., Tokyo, Japan

[21] Appl. No.: 09/017,317

[22] Filed: Feb. 2, 1998

[30] Foreign Application Priority Data

Feb. 3, 1997 [JP] Japan .................................. 9-034381

[51] Int. Cl.⁷ ...................... B32B 25/20; B32B 18/00; C08L 83/07
[52] U.S. Cl. ...................... 428/325; 428/328; 428/331; 428/447; 428/451; 524/437; 524/493; 524/588; 524/789; 524/860; 524/861; 524/862; 524/865
[58] Field of Search ...................... 524/437, 493, 524/588, 789, 860, 861, 862, 865; 428/447, 451, 325, 328, 331

[56] References Cited

U.S. PATENT DOCUMENTS 5,519,080  5/1996  Matsushita et al. .................... 524/437
5,863,969  1/1999  Ward et al. ............................. 524/437

*Primary Examiner*—D. S. Nakarani
*Attorney, Agent, or Firm*—Millen, White, Zelano & Branigan

[57] ABSTRACT

A silicone rubber composition comprising (A) 100 parts by weight of an organopolysiloxane composition of the organic peroxide or addition curing type, (B) 1–100 parts by weight of finely divided silica, and (C) 30–500 parts by weight of aluminum hydroxide is suitable for use as a high-voltage electrical insulator. The aluminum hydroxide (C) has a water-soluble sodium ion content of up to 0.01% by weight and exhibits pH 6.5–8.0 and an electrical conductivity of up to 50 $\mu$s/cm when measured as a 30 wt % water slurry and preferably has been treated to be hydrophobic. The composition cures into a silicone rubber having improved high-voltage electrical insulating properties even under rigorous conditions.

25 Claims, No Drawings

SILICONE RUBBER COMPOSITIONS FOR HIGH-VOLTAGE ELECTRICAL INSULATORS AND POLYMER INSULATORS

BACKGROUND OF THE INVENTION

1. Field of the Invention

This invention relates to a silicone rubber composition which on heat curing provides silicone rubber having minimized moisture pickup and sufficiently improved electrical properties to serve as high-voltage electrical insulators. The invention also relates to a polymer insulator obtained by covering a plastic core with a cured product of the silicone rubber composition.

2. Prior Art

In general, high-voltage electrical insulating materials for use as insulators and bushings for power transmission lines and power substations are of porcelain or glass. These insulators are heavy and liable to breakage. In a pollutive environment as in seaside areas and industrial areas, there is a tendency that dust, salts and mist attach to the surface of high-voltage electrical insulators, causing leakage current and dry band discharge leading to flashover.

In order to eliminate the drawbacks of porcelain and glass insulators, a number of proposals have been made. For example, U.S. Pat. No. 3,511,698 discloses a weather resistant high-voltage electrical insulator comprising a member of a thermosetting resin and a platinum catalyst-containing organopolysiloxane elastomer. JP-A 198604/1984 corresponding to U.S. Pat. No. 4,476,155 proposes a one-part room temperature curable organopolysiloxane composition which is applied to the outer surface of an electrical insulator of glass or porcelain so that the electrical insulator may maintain its high insulating properties even in the presence of outdoor stresses such as moisture, air pollution and ultraviolet radiation.

JP-B 35982/1978 corresponding to U.S. Pat. No. 3,965,065 and JP-A 209655/1992 corresponding to U.S. Pat. No. 5,369,161 disclose that a silicone rubber composition with improved electrical insulation is obtained by heating a mixture of an organopolysiloxane capable of heat curing into silicone rubber and aluminum hydrate at temperatures above 100° C. for more than 30 minutes. JP-A 57574/1995 corresponding to U.S. Pat. No. 5,519,080 describes that the blending of a methylalkylpolysiloxane fluid in silicone rubber is effective for providing contact angle recovery with time and preventing flashover.

However, the silicone rubber materials used in the prior art techniques mentioned above are not yet fully satisfactory in high-voltage electrical insulation. They must be loaded with large amounts of aluminum hydroxide in order to improve the electrical insulation, but at the sacrifice of mechanical strength. Upon prolonged exposure to outdoor conditions, the silicone rubber materials tend to attract dust which can cause failure.

SUMMARY OF THE INVENTION

Therefore, an object of the present invention is to provide a novel and improved silicone rubber composition for use as a high-voltage electrical insulator which heat cures into a silicone rubber having improved high-voltage electrical insulating properties including weathering resistance, voltage resistance, tracking resistance, arc resistance, and erosion resistance even in an application where the silicone rubber is exposed to serious air pollution and rigorous weather.

Another object of the present invention is to provide a high-voltage electrical insulator (a polymer insulator).

We have found that an organopolysiloxane composition of the organic peroxide or addition curing type is blended with finely divided silica and aluminum hydroxide to produce a silicone rubber composition which is suitable for use as a high-voltage electrical insulator. The aluminum hydroxide should have a water-soluble sodium ion content of up to 0.01% by weight and exhibit pH 6.5 to 8.0 and an electrical conductivity of up to 50 μs/cm when measured as a 30% by weight water slurry. The resulting silicone rubber composition will cure into a silicone rubber having low moisture absorption and improved electrical properties after water immersion, especially improved high-voltage electrical insulating properties including weathering resistance, voltage resistance, tracking resistance, arc resistance, and erosion resistance. Better results are obtained when such high purity aluminum hydroxide is hydrophobic on its surface as a result of hydrophobic treatment with a surface treating agent. More particularly, aluminum hydroxide inherently contains ionic components, especially a water-soluble sodium ion originating from its manufacturing process. We have found that the sodium ion has a detrimental effect on the electrical properties of the composition; and that the objects of the invention is achievable when the aluminum hydroxide is purified to the above-defined level by removing the ionic components, and especially when the purified aluminum hydroxide is further subject to a hydrophobic treatment.

According to the invention, there is provided a silicone rubber composition for use as a high-voltage electrical insulator comprising (A) 100 parts by weight of an organopolysiloxane composition of the organic peroxide or addition curing type, (B) about 1 to about 100 parts by weight of finely divided silica, and (C) about 30 to about 500 parts by weight of aluminum hydroxide. The aluminum hydroxide should have a water-soluble sodium ion content of up to 0.01% by weight and exhibit a pH value of 6.5 to 8.0 and an electrical conductivity of up to 50 μs/cm when measured as a 30% by weight water slurry. Preferably, the aluminum hydroxide (C) has been subjected to a hydrophobic treatment with a surface treating agent for rendering the surface hydrophobic, for example, a silane coupling agent or a partial hydrolyzate thereof.

There is also provided a polymer insulator obtained by covering a plastic core with a cured product of the above-defined silicone rubber composition.

DETAILED DESCRIPTION OF THE INVENTION

A first component (A) of the silicone rubber composition for use as a high-voltage electrical insulator according to the present invention is an organopolysiloxane composition of the organic peroxide curing type or addition curing type.

The organopolysiloxane composition of the organic peroxide curing type is preferably a composition comprising (I) an organopolysiloxane having on the average at least two alkenyl groups in a molecule and (II) an organic peroxide. The organopolysiloxane (I) is represented by the following average compositional formula (1):

$$R^1{}_a SiO_{(4-a)/2} \tag{1}$$

wherein $R^1$ is a substituted or unsubstituted monovalent hydrocarbon group, 0.01 to 20 mol % of $R^1$ being an alkenyl group, and letter a is a positive number of 1.9 to 2.4.

In the alkenyl-bearing organopolysiloxane of formula (1), $R^1$ is preferably a substituted or unsubstituted monovalent hydrocarbon group of 1 to 12 carbon atoms, more preferably 1 to 8 carbon atoms, for example, alkyl groups such as methyl, ethyl, propyl, isopropyl, butyl, isobutyl, tert-butyl, hexyl, cyclohexyl, and octyl; alkenyl groups such as vinyl, allyl, propenyl, isopropenyl, and butenyl; aryl groups such as phenyl, tolyl, and xylyl; aralkyl groups such as benzyl and phenylethyl; and halogen or cyano-substituted hydrocarbon groups, such as chloromethyl, bromoethyl, 3,3,3-trifluoropropyl, 3-chloropropyl, and cyanoethyl. The substituents represented by $R^1$ may be identical or different. Preferably 0.01 to 20 mol %, more preferably 0.1 to 10 mol % of $R^1$ is an alkenyl group. The organopolysiloxane should have on the average at least two alkenyl groups in a molecule. Although $R^1$ may be any of the foregoing substituents, it is preferable to introduce vinyl as the alkenyl group and methyl and phenyl as the other substituents. Letter a is a positive number in the range of 1.9 to 2.4, preferably 1.95 to 2.2.

The organopolysiloxane of formula (1) may have a linear molecular structure or a branched molecular structure containing $R^1SiO_{3/2}$ and $SiO_{4/2}$ units. Most often, it is a linear diorganopolysiloxane consisting essentially of diorganosiloxane units represented by $R^1_2SiO_{2/2}$ and blocked with a triorganosiloxy unit represented by $R^1_3SiO_{1/2}$ at each end of a molecular chain. An alkenyl group in a molecule may be attached to the silicon atom either at the end or at an intermediate of the molecular chain or both. From the standpoints of curing behavior and cured physical properties, the preferred diorganopolysiloxane should have an alkenyl group attached to the silicon atom at each end of the molecular chain.

Desirably the alkenyl-bearing organopolysiloxane has preferably an average degree of polymerization of 50 to 100,000, especially 100 to 20,000, and a viscosity of 100 centipoise or more, preferably 100 to 10,000,000 centipoise, more preferably 500 to 1,000,000 centipoise, most preferably 800 to 500,000 centipoise at 25° C.

The alkenyl-bearing organopolysiloxane can be prepared by well-known methods, for example, by effecting equilibration reaction between an organocyclopolysiloxane and a hexaorganodisiloxane in the presence of an alkali or acid catalyst.

The organic peroxide (II) is used as a catalyst for promoting crosslinking reaction of the alkenyl-bearing organopolysiloxane. Illustrative examples of the organic peroxide are given below.

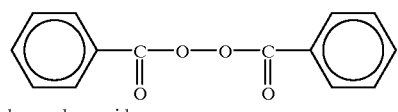
benzoyl peroxide

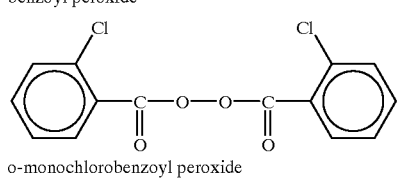
o-monochlorobenzoyl peroxide

-continued

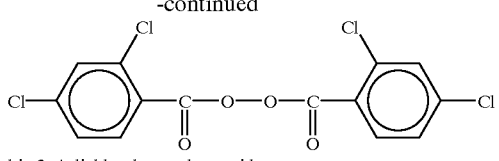
bis-2, 4-dichlorobenzoyl peroxide

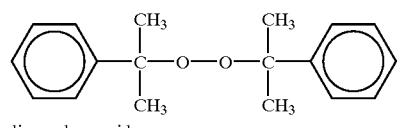
dicumyl peroxide

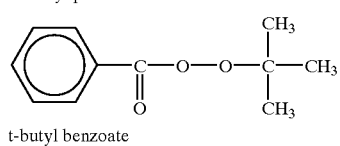
t-butyl benzoate

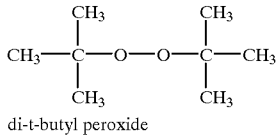
di-t-butyl peroxide

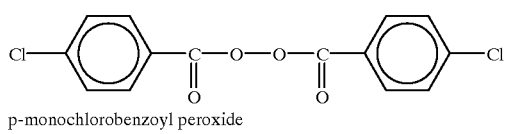
p-monochlorobenzoyl peroxide

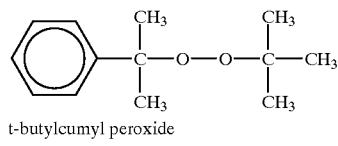
t-butylcumyl peroxide

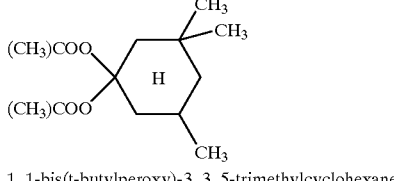
1, 1-bis(t-butylperoxy)-3, 3, 5-trimethylcyclohexane

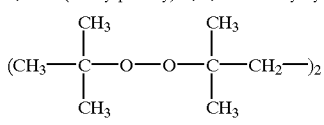
2, 5-dimethyl-2, 5-bis-(t-butylperoxy)hexane

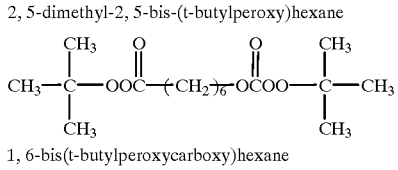
1, 6-bis(t-butylperoxycarboxy)hexane

The amount of the organic peroxide blended is a catalytic amount and may be properly determined in accordance with the desired curing rate. Usually, about 0.1 to about 10 parts, preferably about 0.2 to about 3 parts by weight of the organic peroxide is blended per 100 parts by weight of the alkenyl-bearing organopolysiloxane.

Basically, the above-mentioned organopolysiloxane composition of the organic peroxide curing type is free of fillers including finely divided silica and other inorganic fillers.

Another organopolysiloxane composition is of the addition curing type. Preferred is an organopolysiloxane composition comprising, as main components, (I) an alkenyl-bearing organopolysiloxane of formula (1) as defined above, (III) an organohydrogenpolysiloxane of the following compositional formula (2):

$$R^2{}_b H_c SiO_{(4-b-c)/2} \quad (2)$$

wherein $R^2$ is a substituted or unsubstituted monovalent hydrocarbon group having 1 to 10 carbon atoms, letter b is a positive number of 0.7 to 2.1, preferably 1 to 2, c is a positive number of 0.002 to 1, preferably 0.01 to 0.5, and the sum of b+c is from 0.8 to 3, preferably from 1.5 to 2.6, the organohydrogenpolysiloxane having at least two, preferably at least three hydrogen atoms each attached to a silicon atom in a molecule and being liquid at room temperature, and (IV) an addition reaction catalyst.

The alkenyl-bearing organopolysiloxane of formula (1) used herein is the same as described above for the organopolysiloxane composition of the organic peroxide curing type.

In the organohydrogenpolysiloxane of formula (2), $R^2$ is as defined for $R^1$, preferably a group free of an aliphatic unsaturated bond. Letter b is a positive number of 0.7 to 2.1, preferably 1 to 2, c is a positive number of 0.002 to 1, preferably 0.01 to 0.5, and the sum of b+c is from 0.8 to 3, preferably from 1.5 to 2.6.

The organohydrogenpolysiloxane serves as a crosslinking agent for the base component (I) in the presence of an addition reaction catalyst. It contains on the average at least two, preferably at least three hydrogen atoms each attached to a silicon atom (that is, SiH groups) in a molecule. The SiH groups may be positioned either at the end or at an intermediate of the molecular chain or both.

Examples of the organohydrogenpolysiloxane include methylhydrogencyclopolysiloxane, both end trimethylsiloxy-blocked methylhydrogenpolysiloxane, both end trimethylsiloxy-blocked dimethylsiloxane-methylhydrogenpolysiloxane copolymers, both end dimethylhydrogensiloxy-blocked dimethylsiloxane, both end dimethylhydrogenpolysiloxy-blocked dimethylsiloxane, both end dimethylhydrogenpolysiloxy-blocked dimethylsiloxane-methylhydrogenpolysiloxane copolymers, both end trimethylsiloxy-blocked methylhydrogenpolysiloxanediphenylsiloxane-dimethylsiloxane copolymers, copolymers consisting of $(CH_3)_2 HSiO_{1/2}$ units and $SiO_{4/2}$ units, and copolymers consisting of $(CH_3)_2 HSiO_{1/2}$ units, $SiO_{4/2}$ units, and $(C_6H_5)SiO_{3/2}$ units.

The organohydrogenpolysiloxane of formula (2) may have a linear, branched or cyclic molecular structure. It must be liquid at room temperature. Its viscosity is desirably from 0.1 to 10,000 centipoise at 25° C., especially from 0.5 to 5,000 centipoise at 25° C. The number of SiH groups in a molecule is usually on the average 2.01 to about 300, preferably 2.5 to about 100.

The organohydrogenpolysiloxane can be prepared by well-known methods.

Usually, the organohydrogenpolysiloxane is blended in an amount of about 0.1 to about 300 parts, preferably about 0.3 to about 200 parts, especially about 0.5 to about 100 parts by weight per 100 parts by weight of the organopolysiloxane (I). Alternatively, the organohydrogenpolysiloxane may be blended in such amounts that 0.5 to 5 mol, preferably 0.8 to 3 mol of hydrogen atoms each attached to a silicon atom in its molecule (SiH groups) are available per mol of alkenyl groups in the organopolysiloxane (I).

The addition reaction catalyst (IV) may be selected from platinum black, platinic chloride, reaction products of chloroplatinic acid with monohydric alcohols, complexes of chloroplatinic acid with olefins, platinum bisacetoacetate, palladium base catalysts, and rhodium base catalysts. The amount of the addition reaction catalyst added is a catalytic amount and is usually from 0.1 to 500 ppm, especially 1 to 100 ppm of metallic platinum, palladium or rhodium.

Basically, the above-mentioned organopolysiloxane composition of the addition curing type is free of fillers including finely divided silica and other inorganic fillers. Addition reaction controlling agents, for example, acetylene alcohol compounds such as ethynylcyclohexanol are optionally added to the composition insofar as the benefits of the invention are not impaired.

A second component (B) is finely divided silica which may be any of those commonly used in conventional silicone rubber compositions. Preferred are precipitated silica, fumed silica and fired silica having a specific surface area of more than about 50 m$^2$/g, especially about 50 to 400 m$^2$/g as measured by the BET method as well as ground quartz and diatomaceous earth having a mean particle size of less than about 50 μm, especially about 0.1 to 20 μm. The finely divided silica is essential as a reinforcement for rubber.

The silica fine powder may be used as such while hydrophobic silica powder is also useful. The hydrophobic silica powder is obtained by surface treating silica powder with organosilazanes such as hexamethyldisilazane, silane coupling agents such as trimethylchlorosilane and organic silicon compounds such as polymethylsiloxane. Examples of the surface active agents (i.e., the organosilazanes, silane coupling agents and organic silicon compounds) include the same as examples of surface active agents for alulminum hydroxide, component (C), described later. Silica powder may be subject to hydrophobic treatment before or during blending.

Component (B) is blended in an amount of about 1 to about 100 parts, preferably about 2 to about 50 parts by weight per 100 parts by weight of component (A). On this basis, compositions containing less than 1 part of component (B) would be low in mechanical strength whereas the presence of more than 100 parts of component (B) would inhibit high loading of component (C) or aluminum hydroxide.

A third component (C) is aluminum hydroxide which is represented by the formula $Al_2O_3 \cdot 3(H_2O)$ or $Al(OH)_3$, and is effective for improving the electrical insulating properties and heat resistance of silicone rubber. In the prior art, aluminum hydroxide resulting from a certain manufacturing process is used without further treatment. Such untreated aluminum hydroxide contains water-soluble ionic components, especially water-soluble sodium ion which are left behind from the manufacturing process. These ionic components can adversely affect the water absorption and electrical properties of silicone rubber. It is thus essential to remove such deleterious ionic components in order that on long-term use of silicone rubber, the penetration of water into the silicone rubber be inhibited or the silicone rubber maintain electrical properties even if water penetrates into silicone rubber. To this end, untreated aluminum hydroxide is purified by washing with deionized water, low molecular weight alcohols such as methanol, ethanol and butanol, low molecular weight ethers, or polar solvents which can extract out water-soluble sodium ion and other undesirable ionic components. Instead of purifying untreated aluminum hydroxide, aluminum hydroxide can be precipitated from a high purity sodium aluminate solution and this precipitated aluminum hydroxide (i.e., high purity aluminum hydroxide) is also useful.

The purified or precipitated (high purity) aluminum hydroxide should have a water-soluble sodium ion content of up to 0.01% by weight (i.e., 0 to 0.01% by weight), preferably 1 ppb to 0.01% by weight, more preferably 0.1 ppm to 0.005% by weight. When the aluminum hydroxide is dispersed in water to form a 30% by weight slurry, the slurry should exhibit a pH value of 6.5 to 8.0, preferably 7.0 to 8.0 and an electrical conductivity of up to 50 μs/cm (i.e., 0 to 50 μs/cm), preferably 0.01 to 10 μs/cm. If the water-soluble sodium ion content exceeds 0.01% by weight, such aluminum hydroxide causes the composition to absorb some water and hence, the composition gradually picks up water over a long period of time and loses its electrical properties. With pH values of lower than 6.5 or higher than 8.0 or with an electrical conductivity in excess of 50 μs/cm as measured with the 30% by weight water slurry, such aluminum hydroxide can adversely affect the electrical properties of the composition.

It should be noted that the lower limits of the water-soluble sodium ion content and the electrical conductivity are 0 from an idealistic view. However, the lower limits thereof may practically be more than 0 as described above, because it is difficult to allow the water-soluble sodium ion content and the electrical conductivity to be 0 on account of the complicated purification process and the purification limit.

In one preferred embodiment, the starting or untreated aluminum hydroxide is purified by diluting 100 parts of the untreated aluminum hydroxide with 200 parts or more of a polar solvent, and agitating the dilution at a temperature between room temperature and the boiling point of the polar solvent for at least 3 hours for washing. This washing step is repeated until the specific requirements are met. Most often, the washing step is repeated two or three times. After the aluminum hydroxide is dried at temperatures of lower than 150° C., it is ready for use in the present invention. The most preferred polar solvent used herein is deionized water. A mixture of deionized water with another polar solvent is especially preferred because unnecessary organic matter can also be removed.

High purity aluminum hydroxide precipitated from a high purity sodium aluminate solution is commercially available, for example, under the trade name of H320, H320I, HS320 and HS330 from Showa Denko K.K.

If aluminum hydroxide contains much submicron particles with a size of less than 0.3 μm, it has a greater specific surface area which can increase a moisture or water pickup, adversely affecting electrical properties. For this reason, though not critical, the mean particle size of aluminum hydroxide is preferably 1 to 100 μm, more preferably 1.5 to 50 μm, most preferably 2 to 20 μm. In this regard, the aluminum hydroxide powder obtained by the precipitation process is favorable since few submicron particles are formed. The mean particle size is given, for example, as a weight average value by a laser diffraction method using a particle distributor.

The purified or precipitated (high purity) aluminum hydroxide may be used as such, but preferably after hydrophobic treatment. The surface treating agent for rendering the aluminum hydroxide hydrophobic on the surface includes silane coupling agents or partial hydrolyzates thereof, organosilazanes, titanate coupling agents, organopolysiloxane fluids and organohydrogenpolysiloxane fluids.

The silane coupling agent includes an organosilane compound having at least one, preferably 2 to 3 of a hydrolyzable group or atom such as an organoalkoxysilane and organochlorosilane. Illustrative examples of the organoalkoxysilane include methyltrimetoxysilane, ethyltrimethoxysilane, propyltrimethoxysilane, butyltrimethoxysilane, dimethyldimethoxysilane, diethyldimethoxysilane, vinyltrichlorosilane, vinyltriethoxysilane, vinyltrimetoxysilane, trimethylmethoxysilane, triethylmethoxysilane, vinyl-tris (methoxyethoxy)silane, trimethylchlorosilane, trimethylaminosilane, γ-glycidoxypropyltrimethoxysilane, γ-glycidoxypropylmethyldiethoxysilane, β-(3,4-epoxycyclohexyl)ethyltrimethoxysilane, γ-methacryloxypropyltrimethoxysilane, γ-methacryloxypropyltriethoxysilane, dimethyldiethoxysilane, divinyldimethoxysilane, and γ-chloropropyltrimethoxysilane although other silanes may also be used. Partial hydrolyzates of these silanes are also useful.

Examples of the organosilazane used herein include hexaorganodisilazanes such as hexamethyldisilazane, divinyltetramethyldisilazane and diphenyltetramethyldisilazane, and trisilazanes such as octamethyltrisilazane.

Examples of the titanate coupling agent include tetraisopropyl titanate, tetra-n-butyl titanate, butyl titanate dimer, tetrastearyl titanate, triethanolamine titanate, titanium acetylacetonate, titanium ethylacetoacetate, titanium lactate, octylene glycol titanate, isopropyl tristearoyl titanate, isopropyl tridodecylbenzenesulfonyl titanate, isopropyl tris (dioctylpyrophosphate) titanate, bis(dioctylpyrophosphate) oxyacetate titanate, and bis(dioctylpyrophosphate)ethylene titanate.

The organopolysiloxane fluids used herein may be cyclic, linear, branched or network in molecular structure and preferably have a viscosity of 0.65 to 100,000 centistokes at 25° C. The preferred organopolysiloxane fluid is an inactive organopolysiloxane fluid having only methyl groups or methyl groups and phenyl groups as monovalent hydrocarbon groups connected to the silicon atoms.

The organohydrogenpolysiloxane fluids used herein may be cyclic, linear, branched or network in molecular structure and are preferably of the following average compositional formula (3):

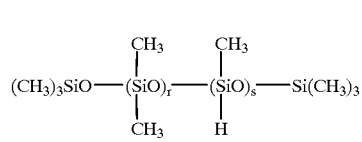

(3)

wherein r ranges from 0 to 50 and s ranges from 1 to 50. Siloxane fluids of formula (3) wherein r exceeds 50 or s exceeds 50 have a too high viscosity to wet the surface, leading to the difficulty of surface treatment.

Preferred among the above-mentioned surface treating agents are the silane coupling agents, especially silicon compounds having hydrolyzable groups. The surface treatment of aluminum hydroxide particles with the silane coupling agents is effective not only for lowering the water absorption and improving the electrical properties, but also for improving the adhesion of a silicone rubber composition to cores over a prolonged period of time and even after water immersion and for improving the tracking resistance of the composition. Of the silane coupling agents, methyltrimethoxysilane and ethyltrimethoxysilane are especially preferred although hexamethyldisilazane is also useful.

In the practice of the invention, 100 parts by weight of aluminum hydroxide is preferably treated with about 0.3 to 50 parts by weight of the surface treating agent. Less than 0.3 part of the treating agent would be ineffective for its purpose whereas more than 50 parts of the treating agent would be wasteful and add to the cost. A more appropriate amount of the surface treating agent is about 0.3 to 30 parts, more preferably 0.3 to 20 parts, most preferably 0.5 to 10 parts by weight per 100 parts by weight of aluminum hydroxide.

With respect to the treating technique, the aluminum hydroxide may be treated directly with the surface treating agent. Alternatively, the aluminum hydroxide is treated with the surface treating agent while being mixed with other components. The surface treatment can be done by well-known techniques. The directly treated aluminum hydroxide is rather preferable. For example, aluminum hydroxide and the surface treating agent are admitted into a mechanical mill closed under atmospheric pressure or a fluidized bed, and mixing operation is carried out at room temperature or elevated temperature, optionally under an inert gas atmosphere. If desired, a catalyst may be added to promote the surface treatment. At the end of mixing, the aluminum hydroxide is dried.

No particular limits are imposed on the nature of the aluminum hydroxide (C) insofar as it meets the requirements of water-soluble sodium ion content, pH, and electrical conductivity. Preferably, the aluminum hydroxide has a mean particle size of 1 to 100 µm, preferably 1.5 to 50 µm, more preferably 2 to 20 µm and a BET specific surface area of 0.1 to 20 $m^2/g$, especially 0.2 to 10 $m^2/g$.

Aluminum hydroxide (C) is blended in an amount of about 30 to about 500 parts, preferably about 50 to about 300 parts by weight per 100 parts by weight of component (A). On this basis, compositions containing less than 30 parts of component (C) cure into products which are less resistant to arc and tracking whereas loading of more than 500 parts of component (C) is difficult and adversely affects workability and rubber physical properties.

If desired, various other components and additives may be added to the silicone rubber composition of the invention depending on its intended application. For example, free silicone oils such as linear dimethylpolysiloxane and hydroxyl-containing dimethylpolysiloxane may be added for imparting water repellency. Exemplary additives include metal oxides such as titanium oxide, iron oxide, cerium oxide, vanadium oxide, cobalt oxide, chromium oxide, and manganese oxide as well as carbon. Pigments, heat resistance enhancers, flame retardants, plasticizers, and reaction controlling agents may also be added insofar as they do not impair the desired properties. These additives may be added in conventional amounts insofar as the benefits of the invention are not lost.

The silicone rubber composition of the invention is obtained simply by uniformly mixing components (A) to (C) and optional components at room temperature. If desired, the components excluding components (II), (III) and (IV) are mixed for about 2 to 4 hours in a planetary mixer or kneader while heating at about 100 to 200° C., and components (II), (III) and (IV) are then mixed with the mixture to complete a composition which is molded and cured. Depending on the viscosity of the mixture, any desired molding method may be selected from casting, compression molding, injection molding and transfer molding. Curing is generally completed by heating at about 80 to about 200° C. for about 3 minutes to about 3 hours.

The silicone rubber composition thus far described cures into a silicone rubber which has not only improved high-voltage electrical properties including voltage resistance, tracking resistance, arc resistance and erosion resistance, but also minimized water pickup, weathering resistance, water repellency, and stain resistance, even in an application where the silicone rubber is exposed to serious air pollution, salt damage and rigorous weather. The silicone rubber is thus useful as high-voltage electrical insulators such as bushings.

The polymer insulator according to the present invention is composed of a plastic core preferably made of a thermoplastic resin such as glass-fiber reinforced thermoplastics, and a cured product of the silicone rubber composition enclosing the plastic core. It may be formed or molded into a cup-like or tubular insulator.

EXAMPLE

Examples of the present invention are given below by way of illustration and not by way of limitation. All parts and percents are by weight.

Purification of Aluminum Hydroxide

The starting material was commonly available untreated particulate aluminum hydroxide having a mean particle size of 8 µm and a BET specific surface area of 2 $m^2/g$ (also referred to as standard aluminum hydroxide). It was purified by dispersing 100 parts of the particles in 200 parts of deionized water, agitating the boiling dispersion for 3 hours for washing, and filtering the particles. This washing step was repeated twice. The collected particles were dried at 105° C. for 5 hours and pulverized, obtaining purified aluminum hydroxide.

Pure water was added to the purified aluminum hydroxide to form a 30% slurry, which was measured for pH and electrical conductivity. The slurry exhibited pH 7.0 and a conductivity of 0.43 µs/cm. The extracted water was subject to flame emission analysis for the quantitative determination of a sodium content (% in aluminum hydroxide). The results are shown in Table 1 together with the data of the standard untreated aluminum hydroxide.

Separately, aluminum hydroxide was precipitated from a high purity sodium aluminate solution. The analytic data of this precipitated aluminum hydroxide are also shown in Table 1.

TABLE 1

|  | Untreated aluminum hydroxide | Purified aluminum hydroxide | Precipitated aluminum hydroxide |
|---|---|---|---|
| Mean particle size (µm) | 8 | 8 | 9 |
| pH | 8.8 | 7.0 | 7.2 |
| conductivity (µs/cm) | 450 | 0.43 | 5 |
| Water extracted Na (%) | 0.045 | 0.003 | 0.003 |

Example 1

The following components were used in the amounts shown in Table 2.

(A-I-a) a dimethylpolysiloxane blocked with a dimethylvinylsiloxy group at each end and having a viscosity of 10,000 centipoise at 25° C.

(A-III) Methylhydrogenpolysiloxane of average compositional formula (4).

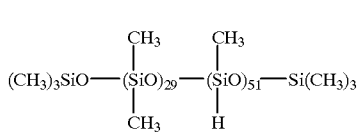

(4)

(A-IV) 2-ethylhexanol solution of 1% chloroplatinic acid (B) finely divided silica in the form of wet silica Nipsil LP (commercially available from Nippon Silica K.K.) having a BET specific surface area of 180 $m^2/g$.

(C) purified aluminum hydroxide.

Reaction controlling agent: ethynylcyclohexanol

First, components (A-I-a), (B) and (C) were agitated and mixed in a planetary mixer at 150° C. for 2 hours and then cooled to room temperature. The remaining components (A-III), (A-IV) and reaction controlling agent were added to the mixture. Uniform mixing yielded a silicone rubber composition. The composition was molded and heat cured at 120° C. for 10 minutes into silicone rubber sheets of 80 mm×80 mm×2 mm (thick) and 1 mm (thick). The sheet of 2 mm thick was measured for initial weight, immersed in pure water at 25° C. for 100 hours, and measured for weight again. A percent weight change is reported as percent water pickup in Table 2. The sheet of 1 mm thick was measured for initial volume resistance, dielectric constant, dielectric loss, and dielectric breakdown voltage according to JIS K6911, immersed in pure water at 25° C. for 100 hours, and measured for the same properties again. The results are shown in Table 2.

Example 2

The following components were used in the amounts shown in Table 2.

(A-I-b) a dimethylpolysiloxane blocked with a trivinylsiloxy group at each end and having a viscosity of 30,000 centipoise at 25° C.

(B) the same as in Example 1.

(C) the same as in Example 1.

Components (A-I-b) and (B) were mixed at elevated temperature as in Example 1. Component (C) and dicumyl peroxide were then added to the mixture, which was mixed at room temperature until uniform, obtaining a silicone rubber composition. The composition was molded and heat cured at 165° C. for 10 minutes, followed by secondary curing at 200° C. for 4 hours. Silicone rubber sheets were obtained as in Example 1. Similar measurements were made, with the results shown in Table 2.

Comparative Examples 1 and 2

Silicone rubber sheets were prepared as in Example 1 except that the untreated aluminum hydroxide was used without purification. The remaining components used are shown in Table 2. Similar measurements were made, with the results shown in Table 2.

TABLE 2

| Components (pbw) | | E1 | E2 | CE1 | CE2 |
|---|---|---|---|---|---|
| (A) | | | | | |
| (I-a) | Organopolysiloxane | 94 | — | 94 | — |
| (I-b) | Organopolysiloxane | — | 100 | — | 100 |
| (II) | Organic peroxide | — | 0.6 | — | 0.6 |
| (III) | Organohydrogenpolysiloxane | 6 | — | 6 | — |
| (IV) | Platinum catalyst | 0.2 | — | 0.2 | — |
| | Reaction controller | 0.1 | — | 0.1 | — |
| (B) | | | | | |
| Wet silica | | 5 | 5 | 5 | 5 |

TABLE 2-continued

| Components (pbw) | E1 | E2 | CE1 | CE2 |
|---|---|---|---|---|
| (C) | | | | |
| Purified aluminum hydroxide | 120 | 120 | — | — |
| Untreated aluminum hydroxide | — | — | 120 | 120 |
| Initial properties | | | | |
| Volume resistance (Ω-cm) | $1.3 \times 10^{15}$ | $1.2 \times 10^{15}$ | $1.6 \times 10^{14}$ | $2.0 \times 10^{14}$ |
| Dielectric constant @ 60 Hz | 3.8 | 3.8 | 3.8 | 3.8 |
| Dielectric loss (%) | 0.037 | 0.038 | 0.039 | 0.041 |
| Breakdown voltage (kV/mm) | 28 | 28 | 28 | 28 |
| After 100 hr. immersion | | | | |
| Water pickup (wt %) | 0.15 | 0.19 | 0.68 | 0.74 |
| Volume resistance (Ω-cm) | $1.0 \times 10^{15}$ | $0.9 \times 10^{15}$ | $2.3 \times 10^{12}$ | $6.8 \times 10^{11}$ |
| Dielectric constant @ 60 Hz | 4.4 | 4.6 | 7.3 | 7.5 |
| Dielectric loss (%) | 0.087 | 0.089 | 0.112 | 0.125 |
| Breakdown voltage (kV/mm) | 27 | 27 | 14 | 13 |

It should be noted that the initial properties are the values for the silicone rubber sheet immediately after the preparation and before immersing to pure water.

As is evident from Table 2, silicone rubber compositions according to the invention are improved in water pickup, electrical properties and voltage resistance after water immersion, indicating that they prevent water penetration and maintain electrical properties even under long-term weathering and other rigorous environments.

Example 3

The following components were used in the amounts shown in Table 3.

(A-I-a) a dimethylpolysiloxane blocked with a dimethylvinylsiloxy group at each end and having a viscosity of 5,000 centipoise at 25° C.

(A-III) Methylhydrogenpolysiloxane of average formula (4).

(A-IV) 2-ethylhexanol solution of 1% chloroplatinic acid (B) finely divided silica in the form of wet silica Nipsil LP (Nippon Silica K.K.) having a BET specific surface area of 180 m²/g.

(C) purified aluminum hydroxide which was surface treated to be hydrophobic by mixing 100 parts of the aluminum hydroxide with 1 part of methyltrimethoxysilane and effecting heat treatment at 100° C. for one hour.

Reaction controlling agent: ethynylcyclohexanol

First, components (A-I-a), (B) and (C) were agitated and mixed in a planetary mixer at room temperature for one hour. The remaining components (A-III), (A-IV) and reaction controlling agent were added to the mixture. Uniform mixing yielded a silicone rubber composition. The composition was molded and heat cured at 120° C. for 10 minutes into silicone rubber sheets of 80 mm×80 mm×2 mm (thick) and 1 mm (thick). The sheet of 2 mm thick was measured for initial weight, immersed in pure water at 25° C. for 200 hours, and measured for weight again. A percent weight change is reported as percent water pickup in Table 3. The sheet of 1 mm thick was measured for initial volume resistance, dielectric constant, dielectric loss, and dielectric breakdown voltage according to JIS K6911, immersed in pure water at 25° C. for 200 hours, and measured for the same properties again. The results are shown in Table 3.

Example 4

The following components were used in the amounts shown in Table 3.

(A-I-b) a dimethylpolysiloxane blocked with a trivinylsiloxy group at each end and having a viscosity of 50,000 centipoise at 25° C.

(B) the same as in Example 3.

(C) the same as in Example 3.

Components (A-I-b) and (B) were mixed at elevated temperature. Component (C) and dicumyl peroxide were then added to the mixture, which was mixed at room temperature until uniform, obtaining a silicone rubber composition. The composition was molded and heat cured at 165° C. for 10 minutes, followed by secondary curing at 200° C. for 4 hours. Silicone rubber sheets were obtained as in Example 3. Similar measurements were made, with the results shown in Table 3.

Example 5

A silicone rubber composition was obtained by using the same components as in Example 3 except that the precipitated aluminum hydroxide treated with methyltrimethoxysilane (the hydrophobic treatment was the same as in Example 3) was used as component (C), and mixing them at room temperature until uniform. The composition was heat cured at 120° C. for 10 minutes into sheets as in Example 3. Similar measurements were made, with the results shown in Table 3.

Example 6

A silicone rubber composition was obtained by using the same components as in Example 3 except that the precipitated aluminum hydroxide treated with ethyltrimethoxysilane (the hydrophobic treatment was the same as in Example 3) was used as component (C), and mixing them at room temperature until uniform. The composition was heat cured at 120° C. for 10 minutes into sheets as in Example 3. Similar measurements were made, with the results shown in Table 3.

Comparative Example 3

Silicone rubber sheets were prepared as in Example 3 except that the standard (untreated or unpurified) aluminum hydroxide treated with methyltrimethoxysilane (the hydrophobic treatment was the same as in Example 3) was used as component (C). The remaining components used are shown in Table 3. Similar measurements were made, with the results shown in Table 3.

TABLE 3

| Components (pbw) | | E3 | E4 | E5 | E6 | CE3 |
|---|---|---|---|---|---|---|
| (A) | | | | | | |
| (I-a) | Organopolysiloxane | 94 | — | 94 | 94 | 94 |
| (I-b) | Organopolysiloxane | — | 100 | — | — | — |
| (II) | Organic peroxide | — | 0.6 | — | — | — |
| (III) | Organohydrogenpolysiloxane | 6 | — | 6 | 6 | 6 |
| (IV) | Platinum catalyst | 0.2 | — | 0.2 | 0.2 | 0.2 |
| | Reaction controller | 0.1 | — | 0.1 | 0.1 | 0.1 |
| (B) | | | | | | |
| | Wet silica | 5 | 5 | 5 | 5 | 5 |
| (C) | | | | | | |
| | Purified aluminum hydroxide (methyltrimethoxysilane treated) | 120 | 120 | — | — | — |
| | Precipitated aluminum hydroxide (methyltrimethoxysilane treated) | — | — | 120 | — | — |
| | Precipitated aluminum hydroxide (ethyltrimethoxysilane treated) | — | — | — | 120 | — |
| | Standard aluminum hydroxide (methyltrimethoxysilane treated) | — | — | — | — | 120 |
| Initial properties | | | | | | |
| Volume resistance (Ω-cm) | | $3.7 \times 10^{15}$ | $3.8 \times 10^{15}$ | $6.6 \times 10^{15}$ | $5.8 \times 10^{15}$ | $1.6 \times 10^{14}$ |
| Dielectric constant @ 60 Hz | | 2.4 | 2.4 | 2.4 | 2.4 | 3.2 |
| Dielectric loss (%) | | 0.018 | 0.015 | 0.017 | 0.015 | 0.076 |
| Breakdown voltage (kV/mm) | | 30 | 31 | 30 | 29 | 28 |
| After 200 hr. immersion | | | | | | |
| Water pickup (wt %) | | 0.05 | 0.04 | 0.02 | 0.02 | 0.35 |
| Volume resistance (Ω-cm) | | $1.0 \times 10^{15}$ | $1.7 \times 10^{15}$ | $6.0 \times 10^{15}$ | $5.5 \times 10^{15}$ | $2.3 \times 10^{13}$ |
| Dielectric constant @ 60 Hz | | 2.9 | 2.9 | 2.8 | 2.6 | 4.7 |
| Dielectric loss (%) | | 0.038 | 0.035 | 0.034 | 0.031 | 0.125 |
| Breakdown voltage (kV/mm) | | 27 | 29 | 28 | 28 | 20 |

As is evident from Table 3, silicone rubber compositions according to the invention are improved in water pickup, electrical properties and voltage resistance after water immersion, indicating that they prevent water penetration and maintain electrical properties even after immersion in water for 200 hours.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A silicone rubber composition for use as a high-voltage electrical insulator comprising
   (A) 100 parts by weight of an organopolysiloxane composition, wherein said organopolysiloxane composition is curable by an organic peroxide curing catalyst or an addition reaction curing catalyst,
   (B) about 1 to about 100 parts by weight of filler selected from finely divided silica having a surface area of 50–400 m²/g, ground quartz having a mean particle size of less than 50 μm, diatomaceous earth having a mean particle size of less than 50 μm or mixtures thereof, and
   (C) about 30 to about 500 parts by weight of aluminum hydroxide having a water-soluble sodium ion content of up to 0.01% by weight and exhibiting a pH value of 6.5 to 8.0 and an electrical conductivity of up to 50 μs/cm when measured as a 30% by weight water slurry.

2. The silicone rubber composition of claim 1, wherein the aluminum hydroxide (C) has been purified by washing with a polar solvent or precipitated from a sodium aluminate solution.

3. The silicone rubber composition of claim 1 wherein the aluminum hydroxide (C) has been subjected to a hydrophobic treatment with a surface treating agent for rendering the surface hydrophobic.

4. The silicone rubber composition of claim 3 wherein said surface treating agent is a silane coupling agent or a partial hydrolyzate thereof.

5. A silicone rubber composition according to claim 4, wherein said silane coupling agent is methyltrimethoxysilane, ethyltrimethoxysilane, propyltrimethyoxysilane, butyltrimethoxysilane, dimethyldimethoxysilane, diethyldimethoxysilane, vinyltrichlorosilane, vinyltriethoxysilane, vinyltrimetoxysilane, trimethylmethoxysilane, triethylmethoxysilane, vinyltris(methoxyethoxy)silane, trimethylchlorosilane, trimethylaminosilane, γ-glycidoxypropyltrimethoxysilane, γ-glycidoxypropylmethyldiethoxysilane, β-(3,4-epoxycyclohexyl)ethyltrimethoxysilane, γ-methacryloxypropyltrimethoxysilane, γ-methacryloxypropyltriethoxysilane, dimethyldiethoxysilane, divinyldimethoxysilane, or γ-chloropropyltrimethoxysilane.

6. A polymer insulator comprising a plastic core and a cured product of the silicone rubber composition of claim 1 enclosing said plastic core.

7. The silicone rubber composition of claim 1, wherein said organopolysiloxane composition of component (A) comprises (I) an organopolysiloxane having on the average at least two alkenyl groups in a molecule represented by the following average composition formula (1):

$$R^1_a SiO_{(4-a)/2} \qquad (1)$$

wherein $R^1$ is a monovalent hydrocarbon group substituted by halogen or cyano or an unsubstituted monovalent hydrocarbon group, 0.01 to 20 mol % of $R^1$ being an alkenyl group, and letter a is a positive number of 1.9 to 2.4, and (II) an organic peroxide.

8. A silicone rubber composition according to claim 7, wherein $R^1$, in each case, is an unsubstituted monovalent hydrocarbon group of 1 to 12 carbon atoms or a monovalent hydrocarbon of 1 to 12 carbon atoms which is substituted by halogen or cyano.

9. A silicone rubber composition according to claim 8, wherein $R^1$ is, in each case independently, methyl, ethyl, propyl, isopropyl, butyl, isobutyl, tert-butyl, hexyl, cyclohexyl, octyl, vinyl, allyl, propenyl, isopropenyl, butenyl, phenyl, tolyl, xylyl, benzyl, phenylethyl, chloromethyl, bromoethyl, 3,3,3-trifluoropropyl, 3-chloropropyl, or cyanoethyl.

10. A silicone rubber composition according to claim 8, wherein $R^2$ is, in each case independently, methyl, ethyl, propyl, isopropyl, butyl, isobutyl, tert-butyl, hexyl, cyclohexyl, octyl, vinyl, allyl, propenyl, isopropenyl, butenyl, phenyl, tolyl, xylyl, benzyl, phenylethyl, chloromethyl, bromoethyl, 3,3,3-trifluoropropyl, 3-chloropropyl, or cyanoethyl.

11. A silicone rubber composition according to claim 10, wherein component B is a precipitated silica, fumed silica, or fired silica having a specific surface area of 50–400 m²/g.

12. A silicone rubber composition according to claim 7, wherein the alkenyl $R^1$ groups are vinyl and the other $R^1$ groups are each independently methyl or phenyl.

13. A silicone rubber composition according to claim 7, wherein the organopolysiloxane of formula (1) is a linear diorganopolysiloxane having diorganosiloxane units represented by the formula $R^1_2SiO_{2/2}$ blocked at each end of the molecular chain with a triorganosiloxy unit represented by $R^1_3SiO_{1/2}$ wherein an alkenyl group is attached to the silicone atoms at each end of the molecular chain.

14. The silicone rubber composition of claim 1, wherein sad organopolysiloxane composition of compound (A) comprises (I) an organopolysiloxane having on the average at least two alkenyl groups in a molecule represented by the following average composition formula (1):

$$R^1_a SiO_{(4-a)/2} \qquad (1)$$

wherein $R^1$ is a monovalent hydrocarbon group substituted by halogen or cyano or an unsubstituted monovalent hydrocarbon group, 0.01 to 20 mol % of $R^1$ being an alkenyl group, and letter a is a positive number of 1.9 to 2.4, (II) an organohydrogenpolysiloxane having at least two hydrogen atoms each attached to a silicon atom in a molecule and being liquid at room temperature represented by the following compositional formula (2):

$$R^2_b H_c SiO_{(4-b-c)/2} \qquad (2)$$

wherein $R^2$ is a monovalent hydrocarbon group substituted by halogen or cyano or an unsubstituted monovalent hydrocarbon group, in each case having 1 to 10 carbon atoms, letter b is a positive number of 0.7 to 2.1, c is a positive number of 0.002 to 1, and the sum of b+c is from 0.8 to 3, and (III) an addition reaction catalyst.

15. A silicone rubber composition according to claim 14, wherein $R^1$, in each case, is an unsubstituted monovalent hydrocarbon group of 1 to 12 carbon atoms or a monovalent hydrocarbon of 1 to 12 carbon atoms which is substituted by halogen or cyano.

16. A silicone rubber composition according to claim 14, wherein $R^1$ is, in each case independently, methyl, ethyl, propyl, isopropyl, butyl, isobutyl, tert-butyl, hexyl, cyclohexyl, octyl, vinyl, allyl, propenyl, isopropenyl, butenyl, phenyl, tolyl, xylyl, benzyl, phenylethyl, chloromethyl, bromoethyl, 3,3,3-trifluoropropyl, 3-chloropropyl, or cyanoethyl.

17. A silicone rubber composition according to claim 14, wherein the alkenyl $R^1$ groups are vinyl and the other $R^1$ groups are each independently methyl or phenyl.

18. A silicone rubber composition according to claim 14, wherein the organopolysiloxane of formula (1) is a linear diorgranopolysiloxane having diorganosiloxane units represented by the formula $R^1_2SiO_{2/2}$ blocked at each end of the molecular chain with a triorganosiloxy unit represented by $R^1_3SiO_{1/2}$ wherein an alkenyl group is attached to the silicone atoms at each end of the molecular chain.

19. A silicone rubber composition according to claim 14, wherein letter b is a positive number of 1 to 2, letter c is a positive number of 0.01 to 0.5, and the sum of b+c is 1.5 to 2.6.

20. A silicone rubber composition according to claim 14, wherein $R^2$ is, in each case independently, methyl, ethyl, propyl, isopropyl, butyl, isobutyl, tert-butyl, hexyl, cyclohexyl, octyl, vinyl, allyl, propenyl, isopropenyl, butenyl, phenyl, tolyl, xylyl, benzyl, phenylethyl, chloromethyl, bromoethyl, 3,3,3-trifluoropropyl, 3-chloropropyl, or cyanoethyl.

21. A silicone rubber composition according to claim 14, wherein the organohydrogenpolysiloxane is selected from methylhydrogencyclopolysiloxane, both end trimethylsiloxy-blocked methylhydrogenpolysiloxane, both end trimethylsiloxy-blocked dimethylsiloxane-methylhydrogenpolysiloxane copolymers, both end dimethylhydrogensiloxy-blocked dimethylsiloxane, both end dimethylhydrogenpolysiloxy-blocked dimethylsiloxane, both end dimethylhydrogenpolysiloxy-blocked dimethylsiloxane-methylhydrogenpolysiloxane copolymers, both end trimethylsiloxy-blocked methylhydrogenpolysiloxane-diphenylsiloxane-dimethylsiloxane copolymers or copolymers consisting of $(CH_3)_2HSiO_{1/2}$ units, $SiO_{4/2}$ units, and $(C_6H_5)SiO_{3/2}$ units.

22. A silicone rubber composition according to claim 1, wherein component B is a precipitated silica, fumed silica, or fired silica having a specific surface area of 50–400 m²/g.

23. A silicone rubber composition according to claim 1, wherein component B is ground quartz or diatomaceous earth having a mean particle size of 0.1–20 μm.

24. A silicone rubber composition according to claim 1, wherein component B is 2–50 parts by weight per 100 parts by weight of component A, and the amount of component C is 50–300 parts by weight per 100 parts by weight of component A.

25. A silicone rubber composition according to claim 1, wherein aluminum hydroxide component (C) exhibits a pH value of 7.0–8.0 and an electrical conductivity of 0.01–10 μs/cm when measured as a 30% by weight water slurry.

* * * * *